United States Patent [19]

Cross et al.

[11] Patent Number: 5,148,712
[45] Date of Patent: Sep. 22, 1992

[54] BALL DEFLATOR

[75] Inventors: Michael J. Cross, Gurnee; Joe Jasionowski, Park Ridge, both of Ill.

[73] Assignee: Federal Equipment Company, North Chicago, Ill.

[21] Appl. No.: 649,608

[22] Filed: Feb. 1, 1991

[51] Int. Cl.$^5$ ............................................. G01L 7/00
[52] U.S. Cl. ......................................... 73/756; 137/228
[58] Field of Search ................ 73/756, 714, 146.8; 137/228, 227, 226

[56] References Cited

U.S. PATENT DOCUMENTS 3,183,722  5/1965  Unger et al. ........................ 73/756
3,999,430  12/1976  Parduhn .............................. 73/756

FOREIGN PATENT DOCUMENTS 786794  11/1957  United Kingdom ................. 73/756

OTHER PUBLICATIONS

"Professional Painting Equipment for Contractor and Industrial Maintenance", Binks Manufacturing Company, Franklin Park, Ill., Catalog No. PMCCB-2, Jul., 1985, 12 pages.

Primary Examiner—Donald O. Woodiel
Attorney, Agent, or Firm—Welsh & Katz, Ltd.

[57] ABSTRACT

A deflator for monitoring and selectively or simultaneously deflating an inflated item, such as a basketball, includes a body configured with a central passageway, a first end, a second end and at least one side, each having a bore disposed so as to be in fluid communication with the central passageway. The deflator includes a measuring gauge for measuring the pressure of the inflated item and operationally secured to the body to be in fluid communication with the central passageway, an insertion needle for insertion into the inflated item, which is connected to the body and is in fluid communication with the central passageway, and a valve connected to the body portion, which is in fluid communication with the central passageway for selectively deflating the inflated item.

2 Claims, 1 Drawing Sheet

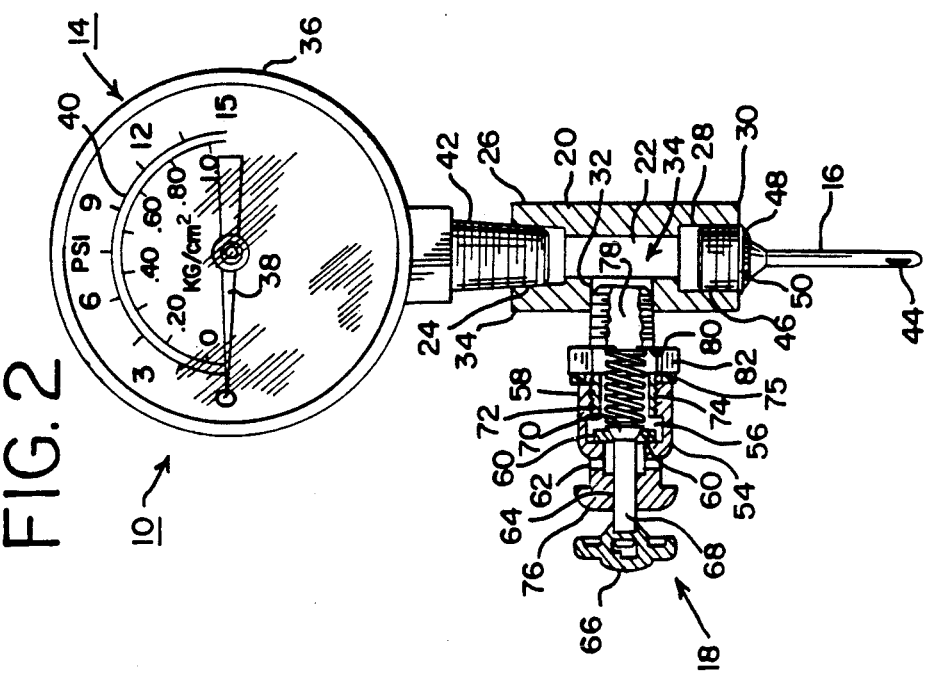
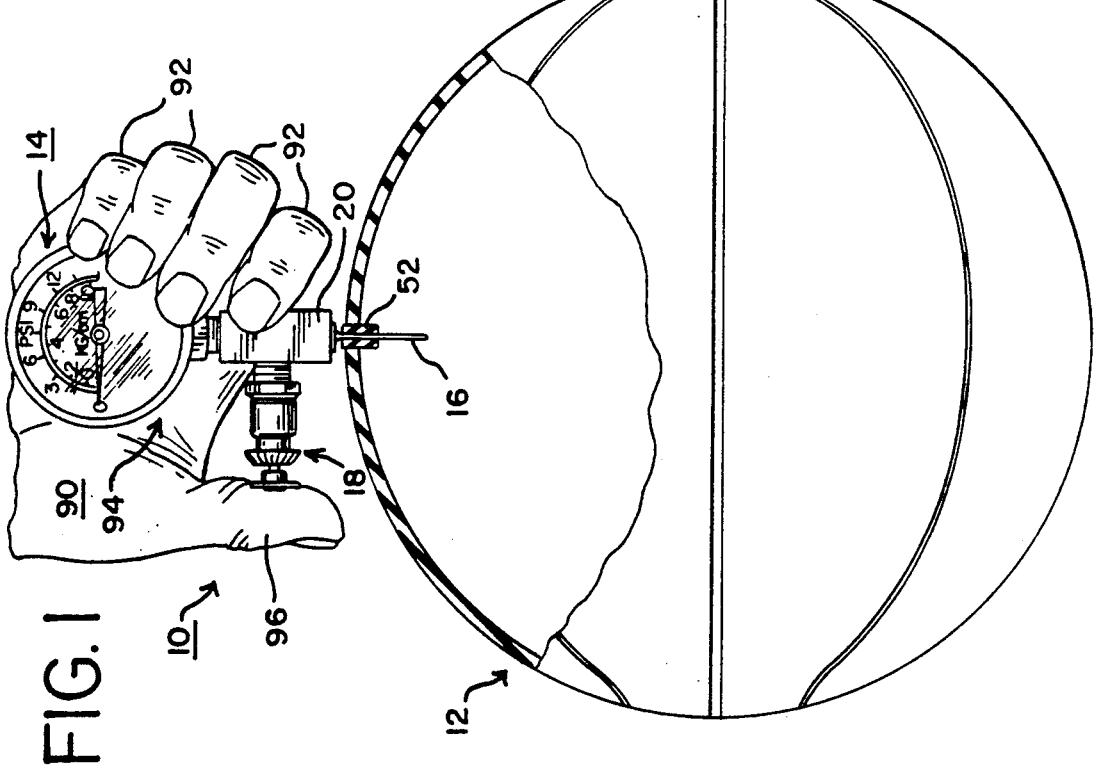

BALL DEFLATOR

This invention relates generally to a device for measuring the air pressure of inflated items, such as sports balls, and more particularly to such a device for measuring and selectively deflating the air pressure of inflated items.

BACKGROUND OF THE INVENTION

Currently, gauges used for measuring and indicating the amount of air pressure in an inflated item are usually incorporated onto a flexible hose, which in turn is connected to an air compressor or other source of pressurized air. These gauges cannot indicate pressure while air is being added, and need to be removed from the inflated item when deflation is called for. Furthermore, conventional air pressure measuring devices do not provide the user with a constant air pressure reading while the item is being deflated. Thus, conventional air pressure measuring devices do not give a reading of air pressure until after the pressure in the item has changed, and as such are often inaccurate, inefficient, and frustrating to use.

Moreover, current air pressure measuring devices or gauges do not give the user the ability to accurately monitor the air pressure of an inflated item while simultaneously deflating the item to a desired air pressure value. In sporting events where inflated balls are used, such as basketball games, accurate air pressure measurements are needed to assure uniform playing conditions regardless of the geographical location or the period of the game. More particularly, according to standard procedures established by the National Basketball Association (NBA) and the National College Athletic Association (NCAA) relating to basketball events, there must be at least a specified number of basketballs on hand which have been correctly inflated to a predetermined air pressure. For example, in the NBA, the current rules require that there be at least 12 balls inflated to a predetermined air pressure ready for play before a game. The maintenance of uniformity of air pressure of each ball is crucial, for it has been determined that for every additional pound per square inch (PSI) of air pressure above the predetermined limit, the basketball will bounce an average of three inches higher on a conventional basketball court over a correctly inflated ball. Therefore, in basketball, as well as other sports, the air pressure of a particular ball can be a significant factor in the overall performance of that ball, and ultimately, in the outcome of the game.

Finally, conventional air pressure measuring devices are generally not designed to fit safely and comfortably into a single human hand. Instead, conventional devices are cumbersome and must be operated with two hands, or by utilizing other portions of the body while holding the inflated item to be measured. Because of this disadvantage, when using conventional air pressure gauges or deflator, the user is often forced to perform near acrobatic movements to grasp and hold the item to be deflated and measured while holding the device.

Once the device is positioned for operation, the user must apply substantial torque and leveraging strength to keep the device properly positioned while holding onto the inflated item to be measured. A common outcome of all these movements required for operating the current devices is a bent or broken deflation needle. Hence, the user loses a substantial amount of time in having to remove the damaged deflation needle and replace it. More frustrating is the problem of the deflation needle being broken inside the inflated item where it is not easily removable, if at all.

SUMMARY OF THE INVENTION

Accordingly, an object of the subject invention is to provide a device for accurately and efficiently measuring the air pressure of an inflated item, such as a basketball.

Another object of the subject invention is to provide an accurate and efficient device for measuring the air pressure of an item, such as a basketball, with or without deflation of the item being measured.

Yet another object of the subject invention is to provide an accurate and efficient device for deflating an item, such as a basketball, to a desired air pressure while simultaneously monitoring the air pressure of that item as it deflates, and which is designed to be easily held and operated single handedly.

In accordance with the present invention, all of these objects, as well as others not herein identified, are achieved generally by the persent ball deflator, including a measuring device, an insertion needle and a valve, all secured to a body having a central passageway. These components are operationally connected to and in fluid communication with each other and the body. The present measuring device can be configured as any conventional air pressure measuring gauge. The insertion needle is a typical hollow needle of the type generally used for inflation and deflation of inflatable items. The valve incorporates a biased control mechanism. When actuated by the user, the valve control mechanism allows air from the inflated item to escape, while the measuring device simultaneously maintains a constant and current air pressure reading.

All of the individual components of the present ball deflator are designed and positioned to fit into the palm of a human hand and to be fully operational with the same hand. The measuring device is positioned to be easily grasped and securely held in the palm of the hand, while the valve is easily accessible by a digit of the same hand. The configuration of the present ball deflator allows the user to easily insert it into an inflated item, such as a basketball or a football, and simultaneously measure air pressure and deflate the ball without having to maintain a constant torque or leveraging strength.

BRIEF DESCRIPTION OF THE DRAWING

Further objects of the invention, together with additional features contributing thereto and advantages occurring therefrom, will be apparent from the following description of one embodiment of the invention when read in conjuction with the accompanying drawings, wherein:

FIG. 1 is a front elevational view of the preferred embodiment of the ball deflator, shown held in place on a conventional basketball, with portions shown cut away for clarity; and FIG. 2 is a partial vertical sectional view of the deflator of FIG. 1.

DETAILED DESCRIPTION OF THE PREFERRED EMBODIMENT

Referring now to FIGS. 1 and 2, the present ball deflator is generally designated at 10. The deflator 10 is generally utilized with an inflated item 12, shown as a conventional basketball; however, it is contemplated that the deflator 10 may be used with conventional footballs, soccer balls, volley balls, or other inflatable items.

The deflator 10 generally includes four main portions: a measuring device 14, an insertion needle 16, and a valve generally indicated at 18, all of which are operationally connected to a support or body 20.

The body 20 can be configured from various rigid materials such as, but not limited to, polymeric materials and metals which are capable of sealingly accommodating pressurized gases. In the preferred embodiment of the invention, the body 20 is made of brass, has two ends and is rectangular in cross-section. Alternatively, the body 20 may be circular or polygonal in cross-section. The body 20 has a central passageway 22 which extends axially therethrough. The passageway 22 permits fluid communication between the above-identified components of the deflator 10. In order to achieve communication between the measuring device 14, the needle 16, and the value 18, the body 20 is provided with a plurality of threaded bores.

Referring now to FIG. 2, these bores include a first throughbore 24 peferably located at an upper end 26 of the body 20, a second throughbore 28 preferably located at a lower end 30 of the body 20, and a side throughbore 32 preferably located in a side wall 34 of the body 20. The bores 24, 28 and 32 are drilled or otherwise formed into the body 20 so as to be in fluid communication with the passageway 22. Also, each of the bores 24, 28 and 32 is tapped to receive threaded components of the device 10.

The gauge assembly, or air pressure measuring device 14 is preferably a conventional air pressure gauge or equivalent measuring device capable of monitoring the air pressure of the item 12, and includes a housing 36, a gauge indicator needle 38, and a scale 40 which is configured to allow the user to observe the amount of pressure in the item 12, preferably in PSI. The measuring device 14 also has an externally threaded stem 42 configured to engage the first throughbore 24 at the upper end 26 of the body 20. The gauge 14 is thereby operationally connected to the body 20 and is in fluid communication with the passageway 22, the insertion needle 16 and the valve 18. Teflon ® brand synthetic sealing tape, or other conventional sealing substances, may be used to sealingly secure the stem 42 to the body 20.

The insertion needle 16 is preferably a conventional hollowed-out insertion needle of the type commonly used with manual air pumps or compressors to either inflate or deflate an inflated item 12. The needle 16 has at least one air port 44 through which air from the inflated item 12 passes into the device 10. The insertion needle 16 also has an externally threaded attachment barrel 46 with an integral knurled ring 48 to facilitate attachment of the needle 16 to the second throughbore 28 at the lower end 30 of the body 20. A conventional O-ring washer 50 may be used to seal the insertion needle 16 to the body 20. Once secured to the body 20, the needle 16 is in fluid communication with the passageway 22, and the gauge 14. Using the needle 16, the deflator 10 may be inserted into a deflator receptacle 52 of the inflated device 12 (best seen in FIG. 1).

In addition to measuring the air pressure of the inflated item 12, the deflator 10 of the present invention permits the user to deflate the inflated item to a desired air pressure through the valve 18. The valve 18 includes a housing 54 which defines a valve chamber 56, and which has an internally threaded attachment end 58, a valve seat 60, preferably configured as a conventional O-ring washer, and at least one laterally opening air outlet 62 disposed on the housing 54 so that the seat 60 is between the outlets and the end 58. The housing 54 also has a throughbore 64 in communication with the chamber 22, the chamber 56 and the outlets 62, and being located in an end of the housing 54 opposite the attachment end 58.

A non-bleeder push-button, or an actuator button 66 is connected to a poppet, or valve stem 68 which is located in the throughbore 64 for reciprocal sliding motion. The valve stem 68 has an end portion 70 opposite the actuator button 66, which sealingly contacts the seat 60. In the preferred embodiment, the end portion 70 has a flared or frustoconical configuration. A coiled inflator spring 72 is positioned within the chamber 56 to engage the end 70 of the valve stem 68 and to bias it against the seat 60. When depressed, the actuator button 66 forces the valve stem 68 against spring 72, thereby overcoming the biasing force of the spring 72. In this manner, air from the the inflated item 12 is allowed to escape through the chamber 22, the chamber 56, and out the air outlets 62.

The valve housing 54 is threadedly connected to an adapter assembly, or valve engagement stem 74. A conventional O-ring 75 maybe used to sealingly engage the valve housing 54 to the valve engagement stem 74. The valve housing 54 is also preferably knurled at 76 for easy removal and replacement upon the body 20. The valve engagement stem 74 has an axial chamber 78 which is configured so as to have a shoulder 80 against which the spring 72 biases and is prevented from entering the body 20. The stem 74 preferably incorporates a hex nut 82 for threading the stem into the side bore 32 of the body 20. The valve 18 is thereby operationally connected to the body 20 and is in fluid communication with the passageway 22, the measuring device 14 and the insertion needle 16. Teflon ® brand synthetic sealing tape, or other conventional sealing substances, may be used to sealingly secure the stem 74 to the body 20. Although the measuring device 14, the needle 16 and the valve 18 are described and shown secured to specific parts of the body 20, it is contemplated that other arrangements of these components may be more suitable for certain applications.

A significant advantage of the present device 10 is that it allows the user to selectively and simultaneously deflate and monitor the air pressure of the deflated item, such as a basketball 12. In other words, it permits the user to measure the air pressure of an inflated item 12 with or without actuating the valve 18. In addition, the user can simultaneously monitor the air pressure of the inflated item 12 while deflating the item to a desired air pressure.

In operation, and referring to FIG. 1, the insertion needle 16 is inserted by the user into the deflator receptacle 52 of the inflated item 12. Once the device 10 is inserted, the user can obtain a current reading of the air pressure of the inflated item 12 by reading the indicator needle 38 of the measuring gauge 14. More importantly, the user can selectively deflate the inflated item 12 by acutating the button 66 until a desired air pressure is achieved. In other words, the user can simultaneously deflate and measure the air pressure of the inflated item 12. If, on the other hand, the user wishes only to measure the pressure of the inflated item 12, the user may simply insert the deflator 20 without actuating the button 66.

The device 10 is designed to be easily and securely grasped and held with one hand. The present invention accomplishes this by positioning the measuring device 14, the insertion needle 16, and the valve 18 relative to each other on the body 20 so as to fit into the palm of the user's hand 90 while the valve 18 remains easily accessible by the user's fingers 92 of the same hand. Once the device 10 is inserted, the measuring device 14 fits snugly into the palm 94 of the user's hand 90 and the valve 18 is fully accessible by the user's fingers 92 (in this case the thumb 96). Hence, the device 10 can be operated by the user with only one hand, which frees the user's other hand for grasping and holding the inflated item 12 to be measured and/or deflated.

In addition to the aforementioned benefits of the present inflator 10, the configuration of the device also eliminates other problems associated with deflators or air pressure measuring devices currently used. Since the device 10 requires less torque and leverage to operate than devices currently on the market, the problem of bent or broken insertion needles is greatly reduced. The user can firmly hold the item 12 in one hand and the device 10 in the other hand during operation.

The foregoing specification describes only the preferred embodiment of the invention as shown. Other embodiments besides the one herein shown and described may be articulated as well, the terms and expressions therefore serve only to describe the invention by example only and not to limit the invention. It is expected that others will perceive differences which, while differing for the foregoing, do not depart from the spirit and its scope of the invention herein described and claimed.

What is claimed is:

1. A deflator for monitoring the inflation pressure of, and selectively deflating an inflated item, comprising:

a rectangularly shaped body having a central passageway, a first end, a second end and four sides, said first and second ends and a first side of said four sides each having a bore, each of said bores being threaded and in fluid communication with said central passageway;

measuring means for measuring the pressure of an inflated item having at least two ends, said measuring means being an air pressure gauge and said measuring means having a threaded stem, said stem being engaged with said bore of said first end of said body, said measuring means being operationally connected and in fluid communication with said central passageway;

insertion means for insertion into an inflated item having a first end configured as a hollow needle with an opening for the ingress of air from the inflated item, said insertion means having a threaded second end having a knurled ring adapted to securely hold said hollow needle end and being engaged with said bore of said second end of said body, said insertion means being operationally connected and in fluid communication with said central passageway;

valve means for selectively deflating an inflated item having at least one air outlet, said valve means having a first end with an actuator including a push-button mechanism being connected to a valve stem which is biased by a spring so that when said stem is actuated it relieves air pressure from the inflated item, said push-button mechanism having a knurled end for easy removal and replacement, said valve means having a threaded second end threadedly engaged with a valve engagement stem, said valve engagement stem threadedly engaged with said bore of said first side of said body, said valve means being operationally connected and in fluid communication with said central passageway;

means for sealingly engaging said measuring means, said insertion means and said valve means into said bores of said first and second ends and said side of said body;

said measuring means, said insertion means, said valve means and said body configured and positioned on the device so as to fit into the palm of a human hand while remaining accessible with a digit from the same hand; and said measuring means, said insertion means and said valve means configured so as to be removable and interchangeably replaceable into said bores of said first and second ends and said side of said body.

2. A deflator for monitoring the inflation pressure of, and selectively deflating an inflated item, comprising:

a rectangularly shaped body having a central passageway, a first end, a second end and four sides, said first and second ends and a first side each having a bore, each of said bores being threaded and in fluid communication with said central passageway;

measuring means for measuring the pressure of an inflated item having at least two ends, said measuring means being an air pressure gauge and said measuring means having a threaded stem, said stem being engaged with said bore of said first end of said body, said measuring means being operationally connected and in fluid communication with said central passageway;

insertion means for insertion into an inflated item having a first end configured as a hollow needle with an opening for the ingress of air from the inflated item, said insertion means having a threaded second end having a knurled ring adapted to securely hold said hollow needle end and being engaged with said bore of said second end of said body, said insertion means being operationally connected and in fluid communication with said central passageway;

valve means for selectively deflating an inflated item having at least one air outlet, said valve means having a first end with an actuator including a push-button mechanism being connected to a valve stem which is biased by a spring so that when said stem is actuated it relieves air pressure from the inflated item, said push-button mechanism having a knurled end for easy removal and replacement, said valve means having a threaded second end threadedly engaged with a valve engagement stem, said valve engagement stem threadedly engaged with said bore of said first side of said body, said valve means being operationally connected and in fluid communication with said central passageway;

means for sealingly engaging said measuring means, said insertion means and said valve means into said bores of said first and second ends and said side of said body;

said measuring means, said insertion means, said valve means and said body configured and positioned on the device so as to fit into the palm of a human hand while remaining accessible with a digit from the same hand; and said measuring means, said insertion means and said valve means configured so as to be removable and replaceable into said bores of said first and second ends and said side of said body.

* * * * *